United States Patent [19]

Davis

[11] Patent Number: 5,331,317
[45] Date of Patent: Jul. 19, 1994

[54] SELECTIVE CALL RECEIVER HAVING ANTI-THEFT DISABLEMENT

[75] Inventor: Walter L. Davis, Coral Springs, Fla.

[73] Assignee: Motorola, Inc., Schaumburg, Ill.

[21] Appl. No.: 709,785

[22] Filed: Jun. 3, 1991

Related U.S. Application Data

[63] Continuation of Ser. No. 516,854, Apr. 30, 1990, abandoned.

[51] Int. Cl.$^5$ .............................................. H04Q 1/00
[52] U.S. Cl. .............................. 340/825.44; 455/343; 455/38.2
[58] Field of Search ...................... 340/825.44, 825, 47, 340/825.52, 825.07, 825.53; 455/343, 38.2

[56] References Cited

U.S. PATENT DOCUMENTS

| | | | |
|---|---|---|---|
| 4,360,801 | 11/1982 | Duhame | 340/825.44 |
| 4,378,551 | 3/1983 | Drapac | 340/311.1 |
| 4,423,416 | 12/1983 | Bailey et al. | 340/825.44 |
| 4,424,514 | 1/1984 | Fennell et al. | 340/825.44 |
| 4,431,991 | 2/1984 | Bailey et al. | 340/825.44 |
| 4,518,961 | 5/1985 | Davis et al. | 340/825.44 |
| 4,554,540 | 11/1985 | Mori et al. | 340/825.44 |
| 4,639,726 | 1/1987 | Ichikawa | 340/825.44 |
| 4,649,538 | 3/1987 | DeLuca et al. | 455/226 |
| 4,663,623 | 5/1987 | Lax et al. | 340/825.44 |
| 4,706,272 | 11/1987 | Nishimura et al. | 379/57 |
| 4,755,816 | 7/1988 | Deluca | 340/825.44 |
| 4,768,031 | 8/1988 | Mori et al. | 340/825.44 |
| 4,839,628 | 6/1990 | Davis et al. | 340/311.1 |
| 4,860,003 | 8/1989 | Deluca et al. | 340/825.44 |
| 4,910,510 | 3/1990 | Davis et al. | 340/825.44 |
| 4,959,644 | 9/1990 | Sato | 340/825.44 |

*Primary Examiner*—Donald J. Yusko
*Assistant Examiner*—Brian Zimmerman
*Attorney, Agent, or Firm*—William E. Koch; Thomas G. Berry

[57] ABSTRACT

A selective call receiver capable of presenting a message comprises a receiver for receiving a signal including a synchronization word and a security code word, and a processor for disabling the selective call receiver if the security code word is not received in conjunction with at least one of a predetermined number of synchronization words.

8 Claims, 7 Drawing Sheets

— PRIOR ART —

SELECTIVE CALL RECEIVER HAVING ANTI-THEFT DISABLEMENT

This is a continuation of application Ser. No. 07/516,854, filed Apr. 30, 1990 now abandoned.

FIELD OF THE INVENTION

This invention relates in general to selective call receivers, and more specifically to a selective call receiver that is disabled by the absence of a security code word in the received signal.

BACKGROUND OF THE INVENTION

Selective call radio receivers such as pagers alert a user when a received signal includes an address code signal identifying that particular selective call receiver. Such devices generally incorporate a radio receiver capable of producing, for example, either an audible alert which may be heard by the user or a tactile alert such as a vibrating sensation which may be felt by the user. Some pagers provide the additional features of a voice message or a message visually displayed on a screen.

Each selective call receiver is identified by a specific address that typically precedes each message. When a selective call receiver receives a message preceded by that selective call receiver's address, the message is stored within a memory for subsequent presentation.

The theft of selective call receivers has become a problem in the industry, especially for the system operators that store large quantities of selective call receivers in warehouses. Due to the signaling format standardization for transmitting the address and message, the selective call receivers are readily interchangeable by modifying a stolen selective call receiver for operation on a different system. When two paging systems operate with the same coding format, it is only necessary to change the operating frequency and the address word of the selective call receiver. It is extremely easy to change the address word commonly contained in a readily modifiable EEPROM code plug, and since most carrier based selective call systems in the United States operate on less than ten frequencies, it is relatively easy for an electronic technician to change the radio frequency of the selective call receiver.

As the design of selective call receivers evolves toward the use of frequency synthesizers and decoders that can decode several different code formats, the theft and conversion of selective call receivers will become even easier in that the conversion process will only involve changing the information contained in an EEPROM.

Thus, what is needed is a selective call receiver that's use is limited to one transmitting system, or to multiple systems with a common operator or owner.

SUMMARY OF THE INVENTION

Accordingly, it is an object of the present invention to provide an improved selective call receiver that, if stolen, can not be readily adapted to operate in another system.

Another object of the present invention is to provide a selective call receiver with anti-theft features that allows a multi-system operator to interchangeably assign selective call receivers to any of the co-owned systems.

In carrying out the above and other objects of the invention in one form, there is provided a selective call receiver capable of presenting a message, comprising a receiver for receiving a signal including a synchronization word and a code word, and a processor for preventing the presentation of the message if the code word is not received in conjunction with at least one of a predetermined number of sync words.

DETAILED DESCRIPTION OF THE INVENTION

Figure 1:
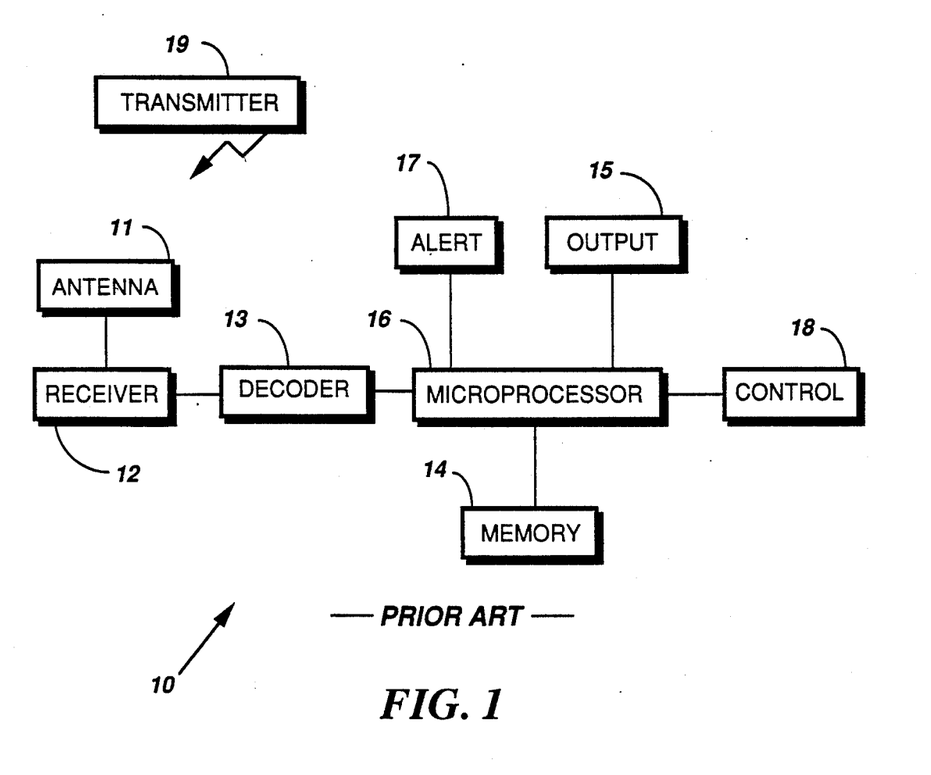
FIG. 1 is a block diagram of a typical selective call receiver.

Referring to FIG. 1, a selective call radio receiver 10, e.g., a pager, comprises an antenna 11 that provides an RF carrier signal that is demodulated by the receiver module 12 to provide a signal suitable for processing by the decoder 13 in a manner well known to one skilled in the art. The decoder 13 processes the recovered signal to decode the address and optional message data contained therein, and if the selective call receiver includes an optional voice output, the recovered audio components of the original signal received by the antenna 11 from a transmitter 19. For selective call receivers with message storage, the recovered message or voice output is stored in the memory 14 for subsequent "playback" by an output module 15. In operation, the microcomputer 16 compares information contained in the recovered signal with predetermined addresses contained in the memory 14, and when substantially similar, alerts the user that a signal has been received by alert mechanism 17. The optional output module 15 will automatically, or when manually selected by controls 18, present the message.

For a more detailed description of the structure and operation of a selective call radio paging receiver of the type shown in FIG. 1, reference is made to U.S. Pat. No. 4,518,961 (see FIG. 1 and column 4, line 57 to column 6, line 29); U.S. Pat. No. 4,649,538 (see FIGS. 2 and 3 and column 4, line 17 to column 8, line 56; and U.S. Pat. No. 4,755,816 (see FIG. 1 and column 2, line 59 to column 3, line 49); the teachings of which are hereby incorporated by reference.

Figure 2:
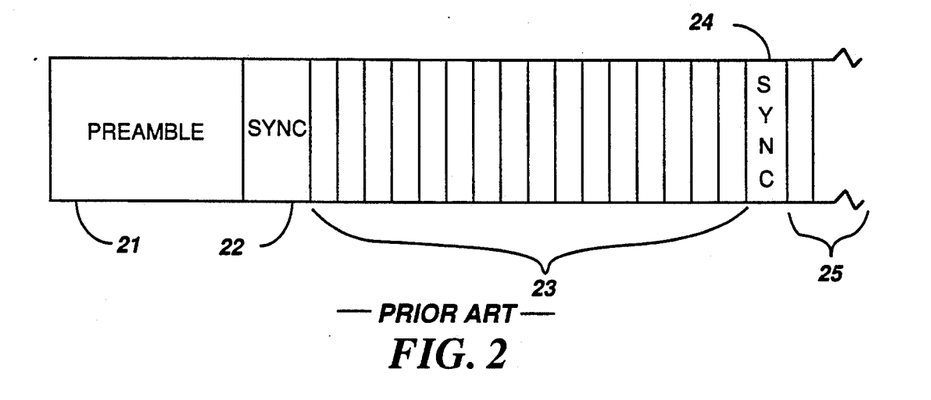
FIG. 2 is a diagram of a conventional signalling format.

Several protocols have been designed for transferring signals to selective call receivers. These protocols include, for example, the POCSAG (Great Britain's Post Office Code Standardization Advisory Group) format as shown in FIG. 2, and GSC (Golay Sequential Code). In these systems, a signal comprises an address if the signal is a tone only signal, or an address and information if the signal is a data signal. The information in a data signal conventionally comprises one of several information formats including numeric (transmitted by BCD), alphanumeric (transmitted by ASCII), or voice (transmitted by digital or analog).

Referring to FIG. 2, the POCSAG code format comprises a preamble 21 that is followed by a repetitive frame structure of synchronization words 22 and address and data signals 23. The preamble signal 21 comprises 544 bits arranged in an alternating pattern of binary 1's and 0's, and is intended to be used by the decoder 13 to establish bit synchronization with the received data signal 23. The first synchronization word that follows the preamble 21 is in turn designed to allow the decoder 13 to establish word synchronization with the received data so that the following address and message information can be processed correctly. Following the first synchronization word, the sync pattern is repeated every seventeen words to insure that all of the decoders in the system maintain word synchronization. Each synchronization is followed by sixteen address and data words that are arranged into eight groups of two words each. In the POCSAG code, a grouping of a sync code and the following sixteen address and data words is referred to as a frame.

In operation, a typical POCSAG paging receiver will be cycled ON and OFF periodically using battery saving techniques that are well known in the art. When no signal is received, the paging decoder is cycled ON and OFF in a pattern that insures it will be turned ON during the preamble portion of the code transmission. As soon as the preamble 21 is detected, which is accomplished in the decoder 13 by establishing bit synchronization with the received signal, the pager receiver 12 remains on until the synchronization code word is detected. Then the decoder 13 switches the receiver 12 ON and OFF in a sequence that allows the decoder 13 to detect subsequent sync code signals 22 as well as the address and data signals 23 contained in one of the eight two-word groups that follow each sync signal 22.

If the decoder 13 determines that an address word assigned to that particular unit has been received, the decoder 13 first determines if the message is a tone-only message, i.e. a message without data, or a data message. The decoder 13 then decodes the message if one is present and generates an alert signal to alert the user to the reception of the message.

Figure 3:
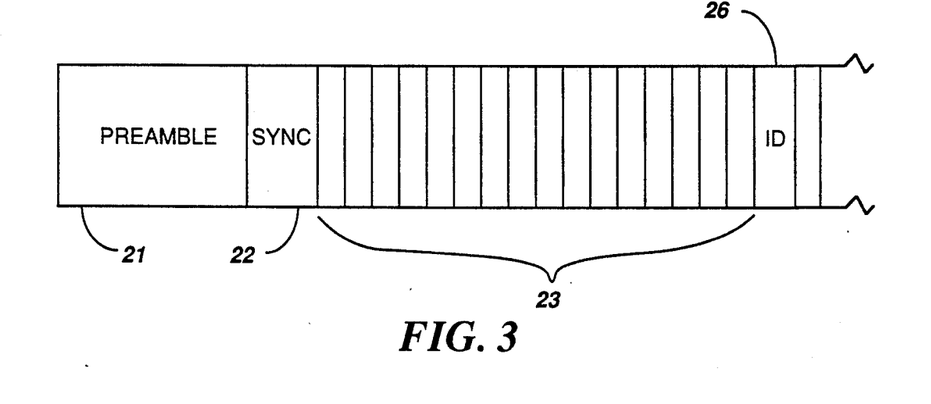
FIG. 3 is a diagram of a signalling format for a first embodiment.
Figure 4:
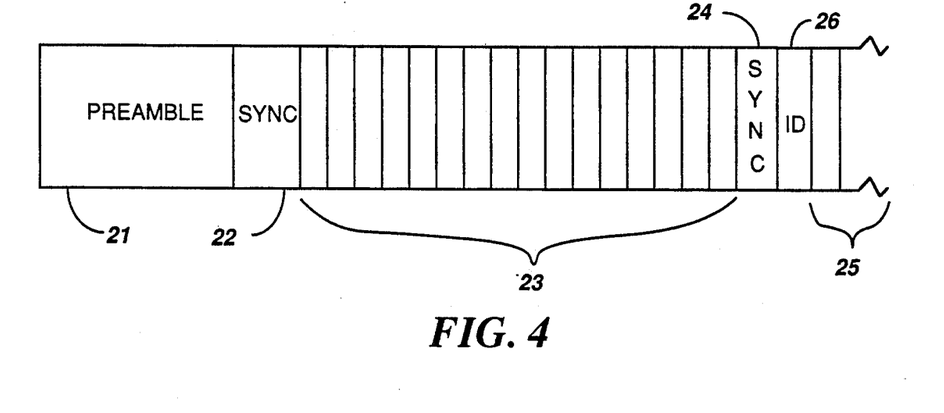
FIG. 4 is a diagram of a signalling format for a second embodiment.

Referring to FIG. 3 and in accordance with the first embodiment, the sync word 24 is replaced periodically, for example every tenth or twentieth occurrence, by a security code word identification ID 26. Alternatively, the second embodiment shown in FIG. 4 reflects that the security code word identification ID 26 periodically, for example every frame or every twenty frames, follows the sync word 24 in place of the first word 25. In other embodiments, the security code word identification ID 26 may be placed anywhere following the preamble of the signalling format.

In operation, each paging system owner would be assigned a unique security code word and the system decoders 13 in each selective call receiver would be modified so that they would only operate if the correct code word is occasionally transmitted by the system. In accordance with the POCSAG standard, a selective call receiver is typically designed to tolerate the absence of any one sync word transmission, and is to continue decoding address signals until two consecutive sync words are missed, at which point the decoder 13 reverts to establishing bit synchronization. Therefore, as in the first embodiment, the occasional replacing of a security code word for a sync word will not adversely affect the reception of addresses. the disabling of the selective call receiver may be accomplished by any one of several methods. For example, the security code word could be permanently entered into the mask ROM data contained in the microcomputer software. If a security code word was not received or if a received code word did not match the security code word in the ROM, the software would prevent presentation of the alert and presentation of any message. For a second example, the code word could be contained in a specially protected region of the EEPROM code plug using the techniques described in U.S. Pat. No. 4,839,628 to provide for factory programming of the security code word while preventing the security code word from being modified in the field.

Figure 5A:
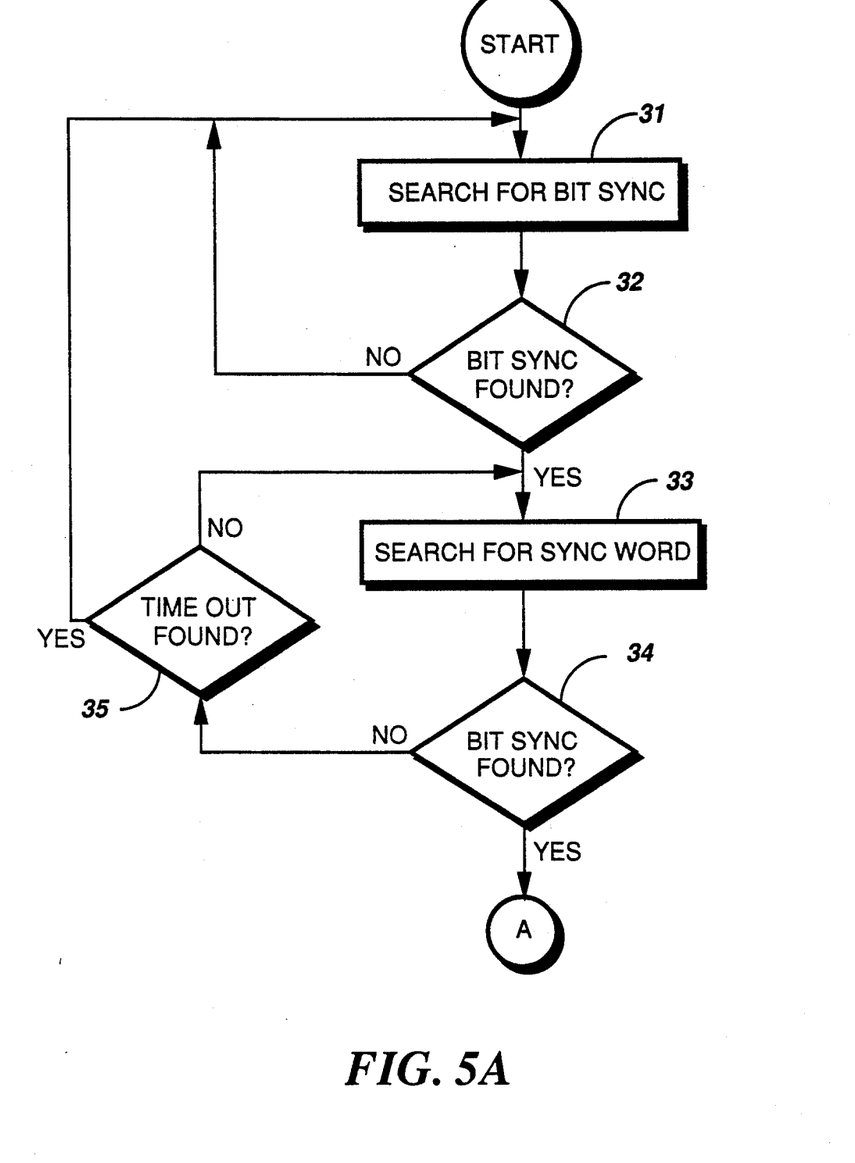
FIGS. 5A and 5B is a flow chart of the first embodiment.
Figure 5B:
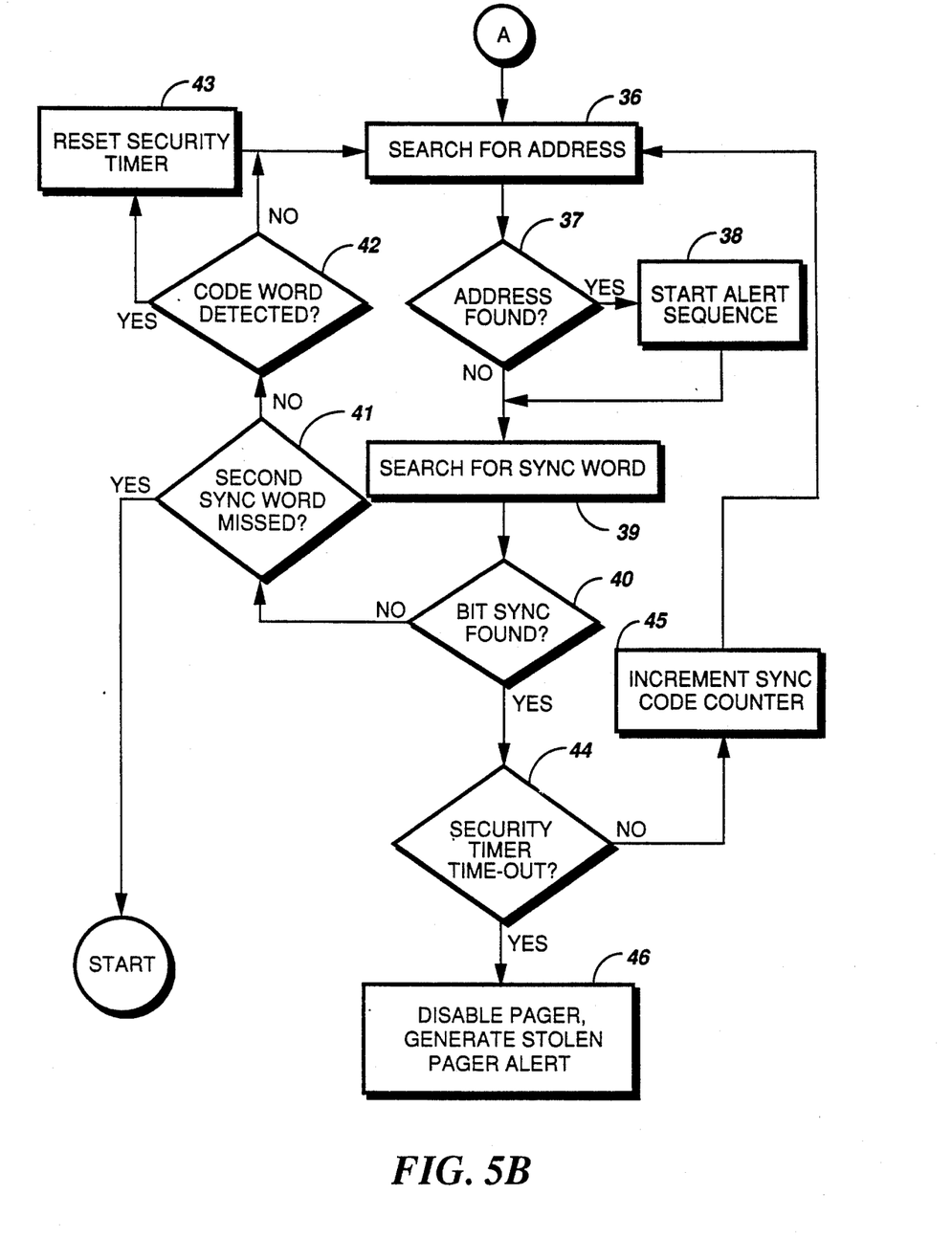

Referring to FIG. 5, the flow chart illustrates how the lack of periodic reception of the security code word identification ID 26 disables the selective call receiver 10. The selective call receiver 10 initially searches 31 for a bit sync signal within the preamble 21 for establishing bit sync, and if found 32, searches 33 for a sync word 22 for establishing frame sync. If the sync word 22 is not found 34, and a predetermined time has expired 35, the search 31 for the bit sync is repeated. However, if the sync word 22 is found 34, a search 36 for an address within words 23 is performed. If found 37, an alert sequence is initiated 38, and a search for a sync word 24 is performed 39. If the bit sync is not found 40, and the sync word is missed 41, the routine returns to step 31. If the sync word is not missed 41, and a code word is detected 42, the security timer is reset 43. If, in step 40, the bit sync is found, and a security timer has not exceeded a predetermined time 44, a sync word counter is incremented 45. If the security timer has exceeded the predetermined time 44, the pager 10 is disabled 46. The selective call receiver may present a message such as STOLEN PAGER.

In other words, once bit and frame sync has been established, the decoder 13 continues to operate while searching for the security signal in the first time position of the first portion of sequentially repeating portions of addresses. In addition, a time-out timer with a time out limit of N signaling frames is started as soon as the first sync word is detected. This time-out timer is reset every time the correct security signal is detected, preventing the time-out timer from timing out. However, if the code word is not detected in N transmissions of the sync word, the timer times out and disables the selective call receiver. Additionally, once the first code word is detected, the decoder may use the periodic nature of the code word transmissions to limit the search for subsequent transmissions of the code word to the appropriate frames, limiting the on-time of the selective call receiver.

Figure 6A:
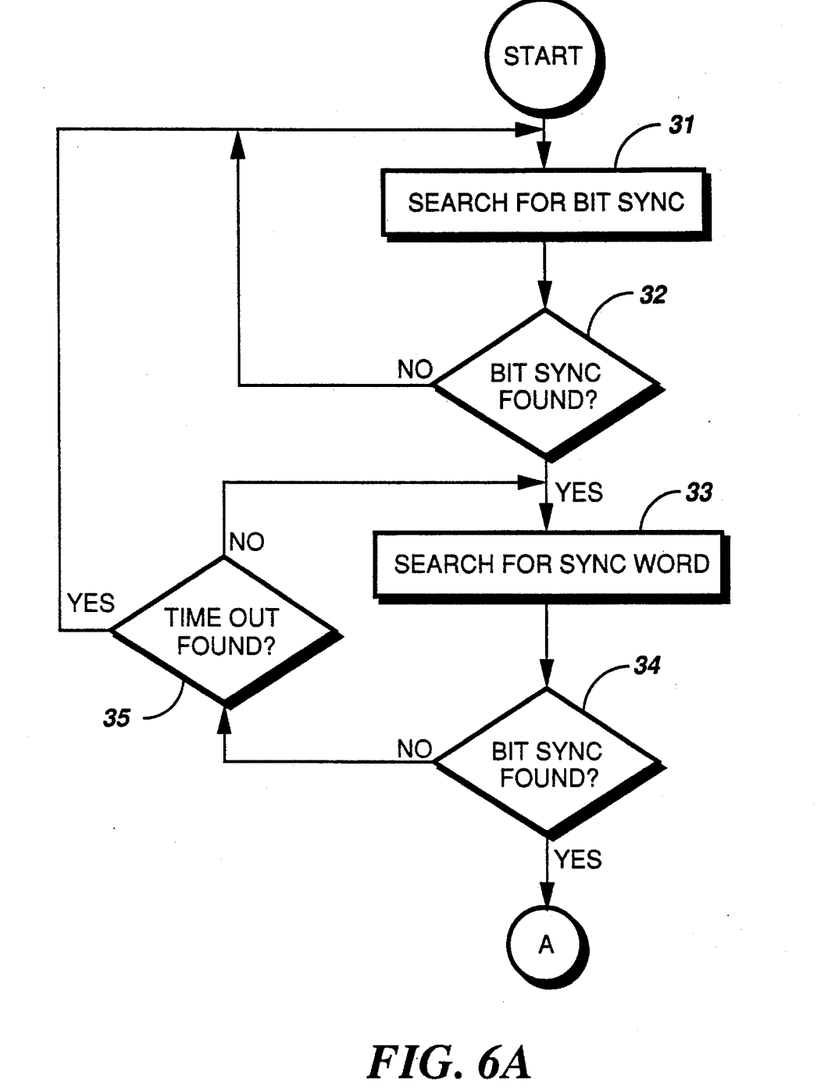
FIGS. 6A, 6B and 6C is a flow chart of the second embodiment.
Figure 6B:
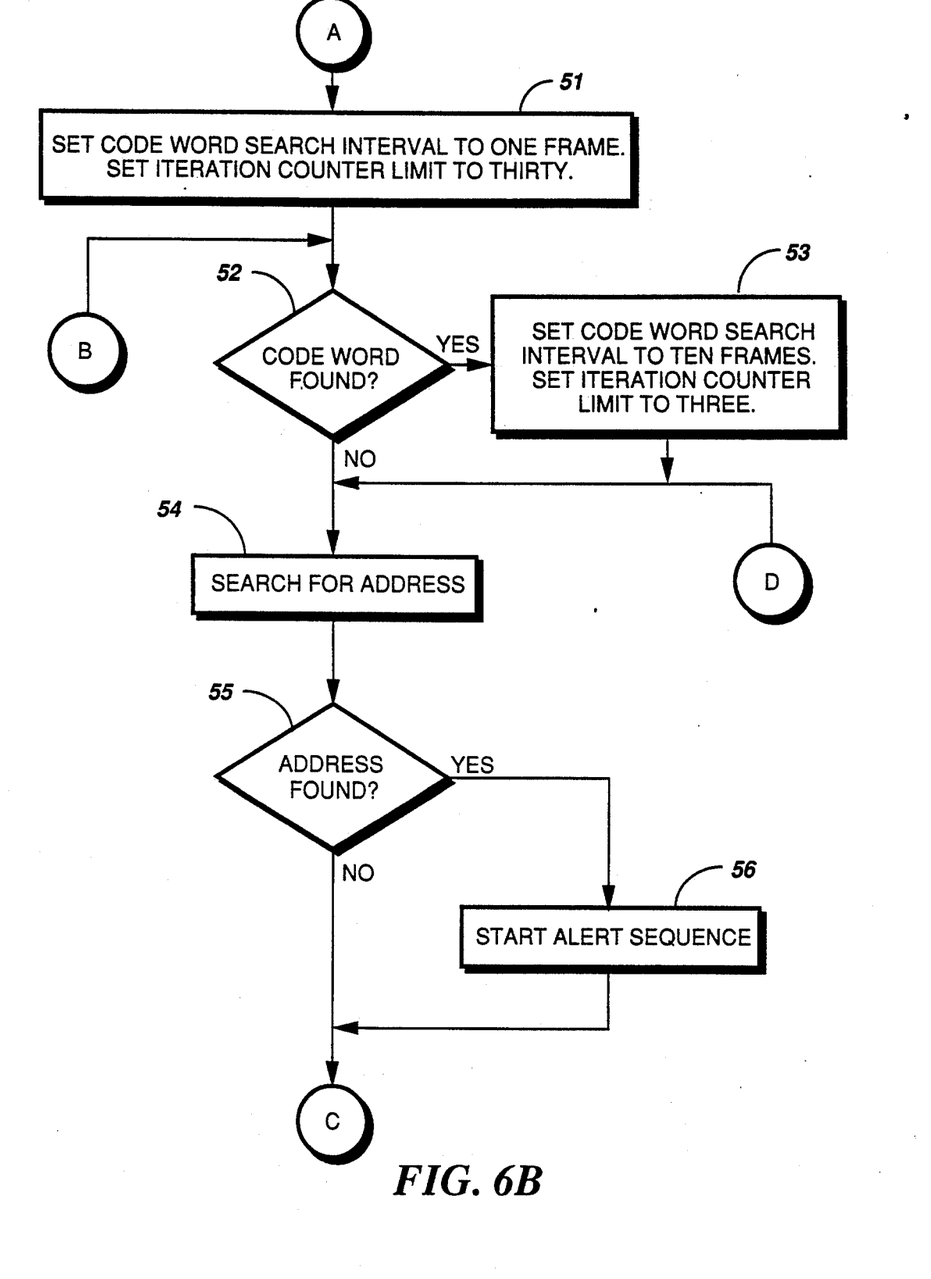
Figure 6C:
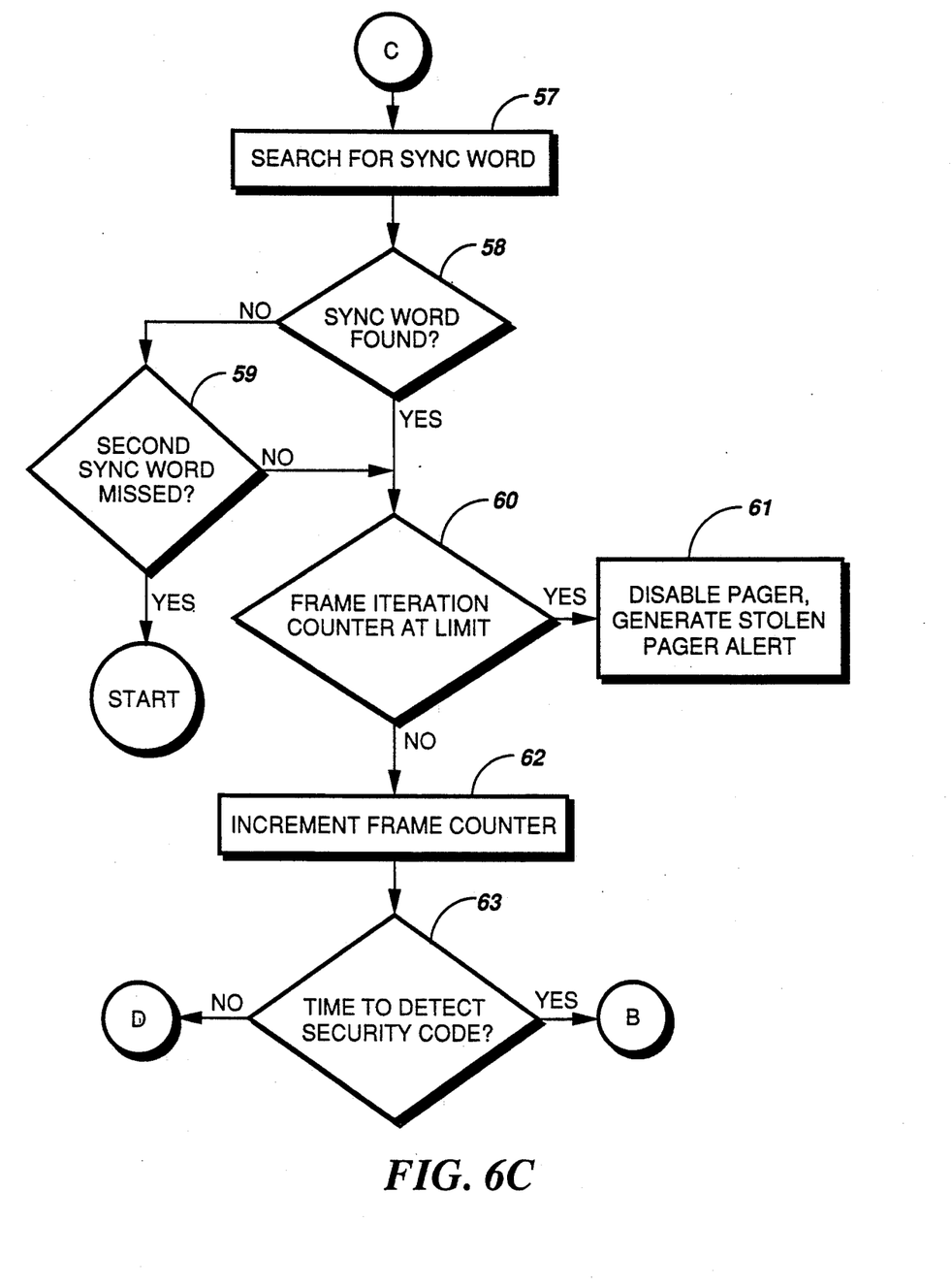

Referring to FIG. 6, the routine for the second embodiment comprises establishing bit and frame sync similar to that described in the first embodiment. If the bit sync is found 34, the code word 26 search interval is set to one frame and the iteration counter limit is set to, for example, thirty. If the code word 26 is found 52, the code word search interval is set to ten frames and the iteration counter limit is set to, for example, three 53. A search for the address word is performed 54, and if found 55, the alert sequence is initiated 56. A search for the sync word 22 is performed 57, and if not found 58 and if the sync word 24 is missed 59, the routine returns to step 31. If the sync word 22 is found 58, or if the sync word 22 is not found 58 and the sync word is not missed 59, and the frame iteration counter is at its limit 60, the selective call receiver is disabled. If not at its limit 60, the frame counter is incremented 62. If it is time to detect 63 the code word, the routine returns to step 52, and if not, to step 54.

This security feature would not have to be activated in every selective call receiver, even if the basic selective call receiver design provides the elements needed for its operation. Thus, it has been shown how a new anti-theft security feature may be incorporated into a selective call receiver without affecting its' ability to operate in systems that use standard code formats. In addition, the protection feature would add virtually no cost to the basic selective call receiver, and could be enabled or disabled at the factory at the request of the system operator. Furthermore, a selective call receiver system operator who owns several selective call receiver systems could use the same security code word in each system, allowing selective call receivers to be used interchangeably in the systems, thus preventing the inventory problems associated with stocking units with different security codes. Alternatively, selective call receivers owned by multi-system operators could be programmed to accept one of a multiplicity of security codes by using decoding techniques that are well known in the art.

I claim:

1. A selective call system comprising:
    transmitter means for transmitting a signal having sequentially repeating portions, each portion including a synchronization word and capable of including at least one address, a security code word included within selected one of the sequentially repeating portions; and
    a plurality of selective call receivers, each including receiver means for receiving the signal, the selective call receiver capable of receiving the at least one address when the security code word is received and being disabled from receiving any further addresses subsequent to when the security code word is not received in conjunction with the reception of a predetermined number of synchronization words.

2. In a selective call receiver for presenting an alert in response to a received signal having a preamble and a plurality of frames, each frame including a plurality of bits, a portion of the bits comprising at least one address within selected frames, the method comprising the steps of:
    (a) establishing bit and frame synchronization;
    (b) providing an alert if an address is received;
    (c) disabling the selective call receiver so that further signals will not be received if a security code word has not been received and a sync word counter has reached a predetermined number;
    (d) incrementing the sync word counter and returning to step (b) if a first sync word is received within a predetermined time;
    (e) resetting the predetermined time and returning to step (b) if the first sync word is not received and a second sync word and the security code word are received; and
    (f) returning to step (a) if the first and second sync word are not received.

3. In a selective call receiver, the method comprising the steps of:
    (a) establishing bit and frame synchronization for a received signal having a preamble and a plurality of frames, each frame comprising a plurality of bits, the bits providing an address, a synchronization word, and a security code word in selected frames;
    (b) setting a security code word search interval to N frames, where N is an integer;
    (c) setting an iteration count limit to M, where M is an integer;
    (d) setting a security code word search interval to N' frames, where N' is an integer and setting an iteration count limit to M', where M' is an integer, if a security code word is received;
    (e) providing an alert if an address is received;
    (f) disabling the selective call receiver so that further signals will not be received if a first sync word is received and a frame iteration count has reached a predetermined count;
    (g) incrementing a frame count and returning to step (d) if the first sync word is received, the frame iteration count has not reached the predetermined count, and the security code word has been received within a predetermined time;
    (h) incrementing the frame count and returning to step (e) if the sync word is received, the frame iteration count has not reached the predetermined count, and the predetermined time has not expired; and
    (i) returning to step (a) if a second sync word is not received.

4. A selective call receiver for presenting messages, comprising:
    receiver means for receiving and decoding a signal, the signal including a repeating preamble, each preamble sequentially followed by a plurality of frames, each frame including a synchronization word and a plurality of data signals, each plurality of frames including at least one security code word within each $N^{th}$ frame, wherein the messages comprise received data signals; and
    processor means for disabling the selective call receiver so that the subsequent reception of the signal will be prevented when the synchronization word is received and the security code word is not received within an $M^{th}$ number of frames.

5. A selective call receiver capable of presenting one or more received messages, comprising:
    receiver means for receiving a signal, the signal including the one or more received messages, a preamble, a plurality of synchronization words and a plurality of security code words; and
    processor means for disabling the reception of further signals subsequent to one of the security code words not being received in conjunction with a predetermined number of the synchronization words.

6. The selective call receiver according to claim 5 wherein the signal comprises sequentially repeating portions, each portion capable of including at least one address, a predetermined number of portions including one of the synchronization words, another of the portions following the predetermined number or portions including one of the security code words, the selective call receiver capable of receiving the at least one address when the security code word is received and being disabled from receiving any of the at least one address subsequent to when the security code word is not received in conjunction with the reception of the predetermined number of synchronization words.

7. The selective call receiver according to claim 5 wherein the signal comprises sequentially repeating portions, each portion including one of the synchronization words and capable of including at least one address, one of the security code words included within selected ones of the sequentially repeating portions, the selective call receiver capable of receiving the at least one address when the security code word is received and being disabled from receiving the at least one address subsequent to when the security code word is not received in conjunction with the reception of the predetermined number of the synchronization words.

8. The selective call receiver according to claim 7 wherein the synchronization words are not included within the selected sequentially repeating portions, the security code word included within the selected sequentially repeating portions occupying the location that would have been occupied by the synchronization word.

* * * * *

UNITED STATES PATENT AND TRADEMARK OFFICE
CERTIFICATE OF CORRECTION

PATENT NO. : 5,331,317
DATED : July 19, 1994
INVENTOR(S) : Davis

It is certified that error appears in the above-indentified patent and that said Letters Patent is hereby corrected as shown below:

Column 6, line 22, after "the" insert --first--.

Signed and Sealed this

Fourteenth Day of February, 1995

Attest:

BRUCE LEHMAN

Attesting Officer      Commissioner of Patents and Trademarks